(12) United States Patent
Wisecup

(10) Patent No.: US 10,571,049 B1
(45) Date of Patent: Feb. 25, 2020

(54) BAND TIGHTENING ASSEMBLY

(71) Applicant: Barry Wisecup, Wyoming, OH (US)

(72) Inventor: Barry Wisecup, Wyoming, OH (US)

(*) Notice: Subject to any disclaimer, the term of this patent is extended or adjusted under 35 U.S.C. 154(b) by 0 days.

(21) Appl. No.: 16/219,097

(22) Filed: Dec. 13, 2018

(51) Int. Cl.
| | |
|---|---|
| F16L 3/137 | (2006.01) |
| F16L 3/14 | (2006.01) |
| F16L 3/233 | (2006.01) |
| B65B 13/00 | (2006.01) |
| B65B 13/02 | (2006.01) |
| B65B 13/18 | (2006.01) |
| B65B 13/34 | (2006.01) |
| H02G 3/32 | (2006.01) |
| F16L 3/12 | (2006.01) |
| B65B 13/04 | (2006.01) |
| H02G 3/38 | (2006.01) |
| B65B 13/22 | (2006.01) |
| H02G 3/00 | (2006.01) |

(52) U.S. Cl.
CPC ............. *F16L 3/1211* (2013.01); *F16L 3/137* (2013.01); *F16L 3/14* (2013.01); *B65B 13/027* (2013.01); *B65B 13/04* (2013.01); *B65B 13/22* (2013.01); *B65B 13/345* (2013.01); *H02G 3/263* (2013.01); *H02G 3/28* (2013.01)

(58) Field of Classification Search
CPC . F16L 3/1211; F16L 3/137; F16L 3/14; F16L 3/323; B25B 25/005; B65B 13/027; B65B 13/04; B65B 13/22; H02G 3/263; H02G 3/28
See application file for complete search history.

(56) References Cited

U.S. PATENT DOCUMENTS

| | | | | |
|---|---|---|---|---|
| 5,048,575 A | * | 9/1991 | Smith | B65B 13/027 140/123.6 |
| 5,483,998 A | * | 1/1996 | Marelin | B25B 25/005 140/150 |
| 8,793,841 B2 | * | 8/2014 | DeBerry | A44B 11/12 24/23 R |
| 9,488,298 B2 | * | 11/2016 | Calvert | F16L 3/137 |
| 2010/0314519 A1 | * | 12/2010 | Watt | F16L 3/233 248/274.1 |
| 2014/0174587 A1 | * | 6/2014 | Rooth | B65B 13/345 140/93.2 |

* cited by examiner

*Primary Examiner* — Tan Le

(57) ABSTRACT

A band tightening assembly includes a guide that is positionable against HVAC ducting. The guide slidably engages a band extending around the HVAC ducting. The guide has a first arm extending along a longitudinal axis that is oriented perpendicular to a second arm such that the first and second arms form a plus. A collar is coupled to the guide and the collar is positioned on the first arm. The collar is oriented to extend along an axis that is offset 4.0 degrees from the longitudinal axis of the first arm. A shaft is rotatably positioned in the collar and the shaft has a rotational axis that is aligned with the axis of the collar. The shaft has a slot therein for insertably receiving the band. The shaft has an engaging well for receiving a socket drive on a power tool. Thus, the shaft is rotated about the rotational axis when the power tool is turned on to tighten the band around the HVAC ducting.

6 Claims, 5 Drawing Sheets

BAND TIGHTENING ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable (f) STATEMENT REGARDING PRIOR DISCLOSURES BY THE INVENTOR OR JOINT INVENTOR Not Applicable

BACKGROUND OF THE INVENTION (1) Field of the Invention (2) Description of Related Art Including Information Disclosed Under 37 CFR 1.97 and 1.98

The disclosure and prior art relates to tightening devices and more particularly pertains to a new tightening device for tightening a suspension band on an HVAC duct with an electric drill.

BRIEF SUMMARY OF THE INVENTION

An embodiment of the disclosure meets the needs presented above by generally comprising a guide that is positionable against HVAC ducting. The guide slidably engages a band extending around the HVAC ducting. The guide has a first arm extending along a longitudinal axis that is oriented perpendicular to a second arm such that the first and second arms form a plus. A collar is coupled to the guide and the collar is positioned on the first arm. The collar is oriented to extend along an axis that is offset 4.0 degrees from the longitudinal axis of the first arm. A shaft is rotatably positioned in the collar and the shaft has a rotational axis that is aligned with the axis of the collar. The shaft has a slot therein for insertably receiving the band. The shaft has an engaging well for receiving a socket drive on a power tool. Thus, the shaft is rotated about the rotational axis when the power tool is turned on to tighten the band around the HVAC ducting.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
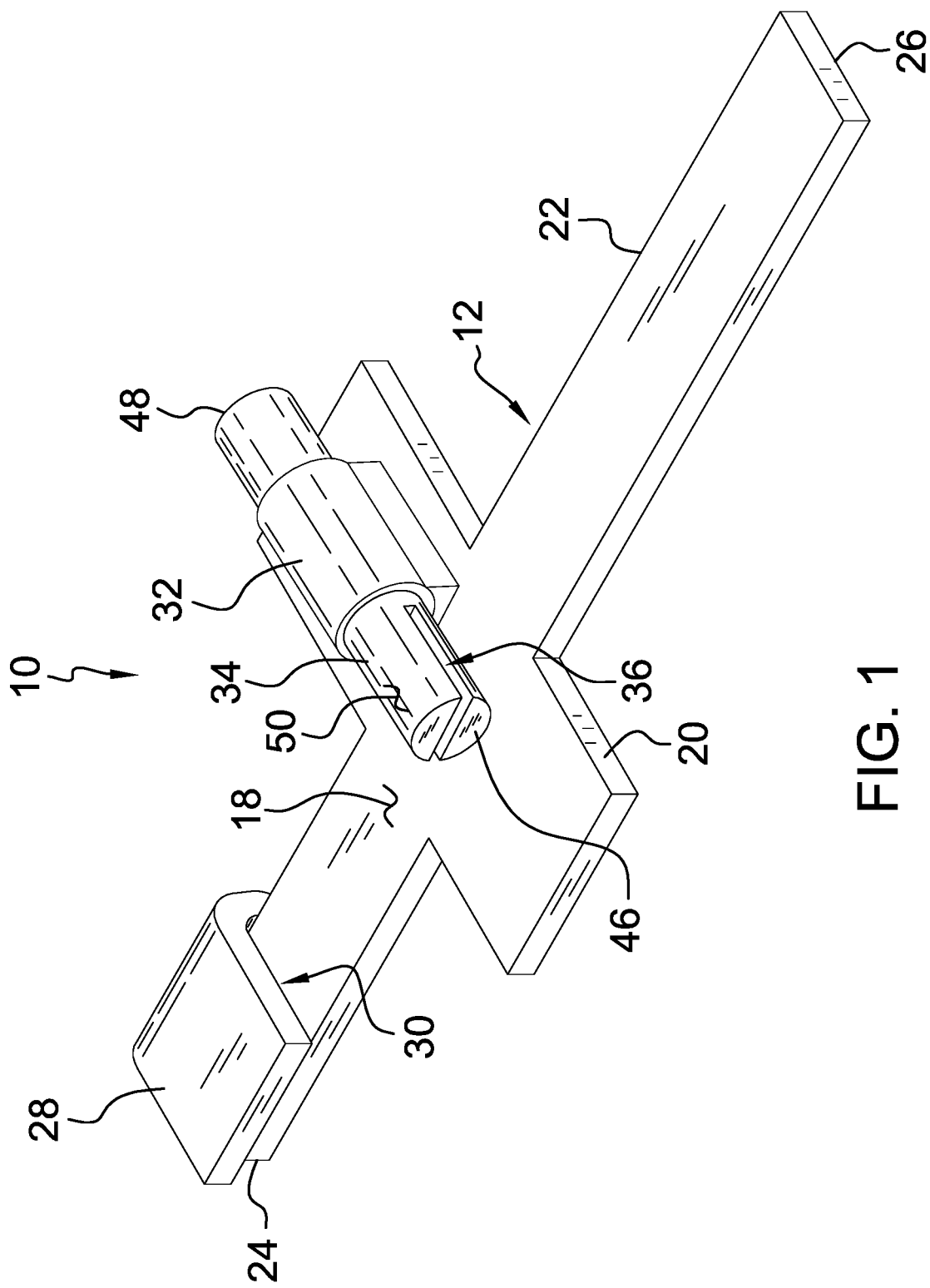
FIG. 1 is a top perspective view of a band tightening assembly according to an embodiment of the disclosure.
Figure 2:
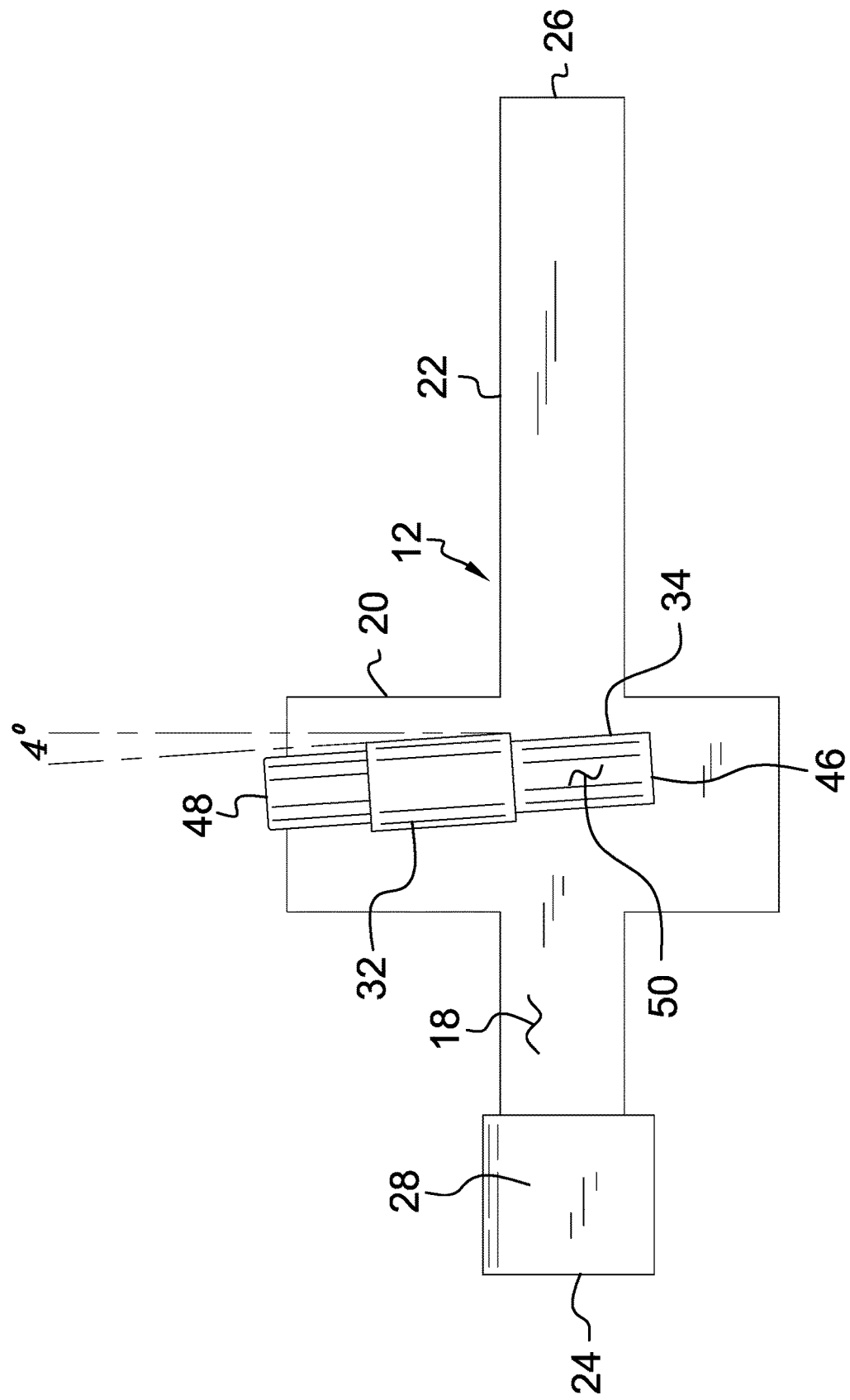
FIG. 2 is a top view of an embodiment of the disclosure.
Figure 3:
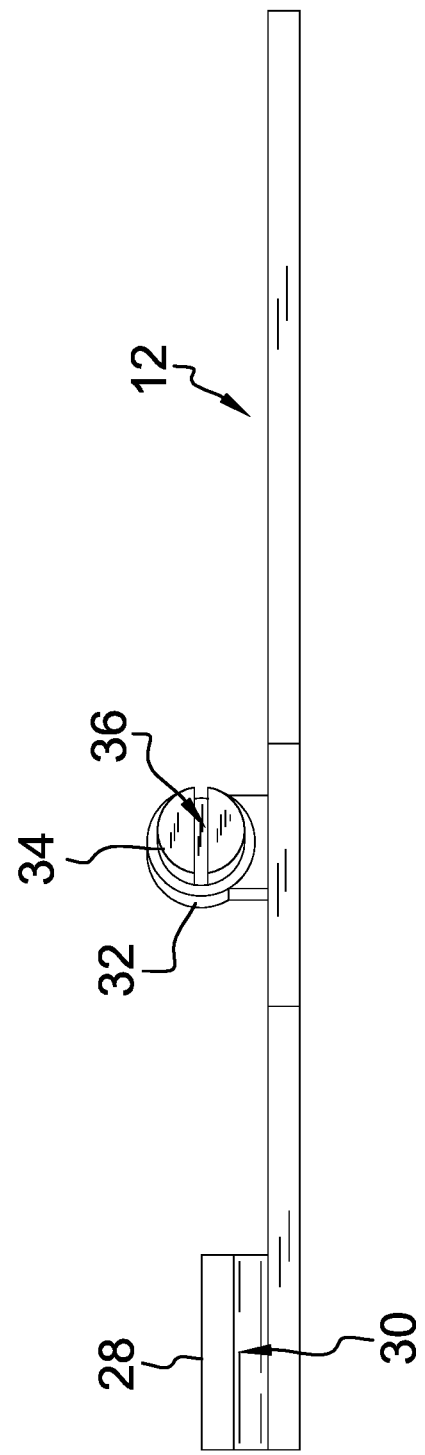
FIG. 3 is a front view of an embodiment of the disclosure.
Figure 4:
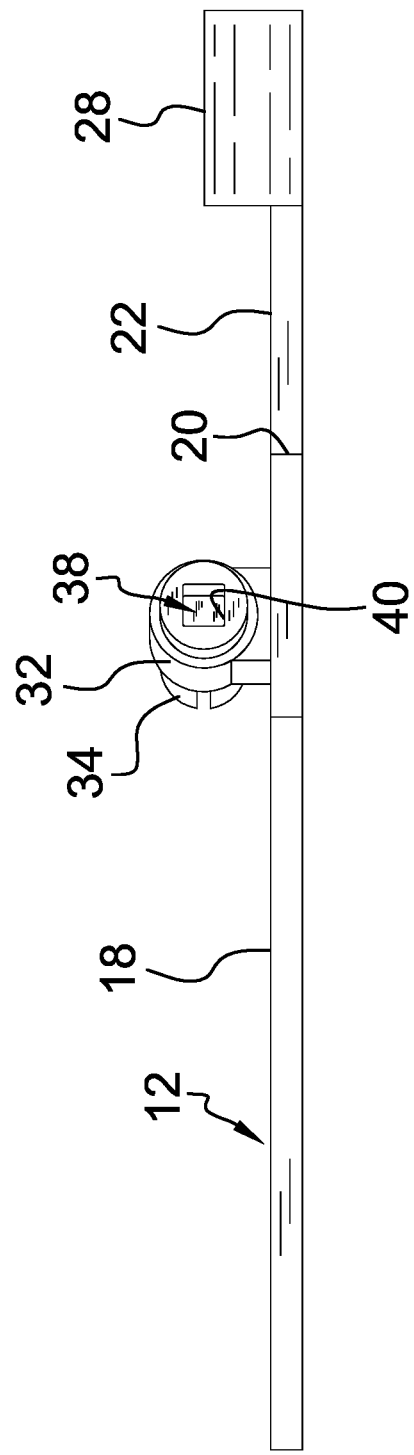
FIG. 4 is a back view of an embodiment of the disclosure.
Figure 5:
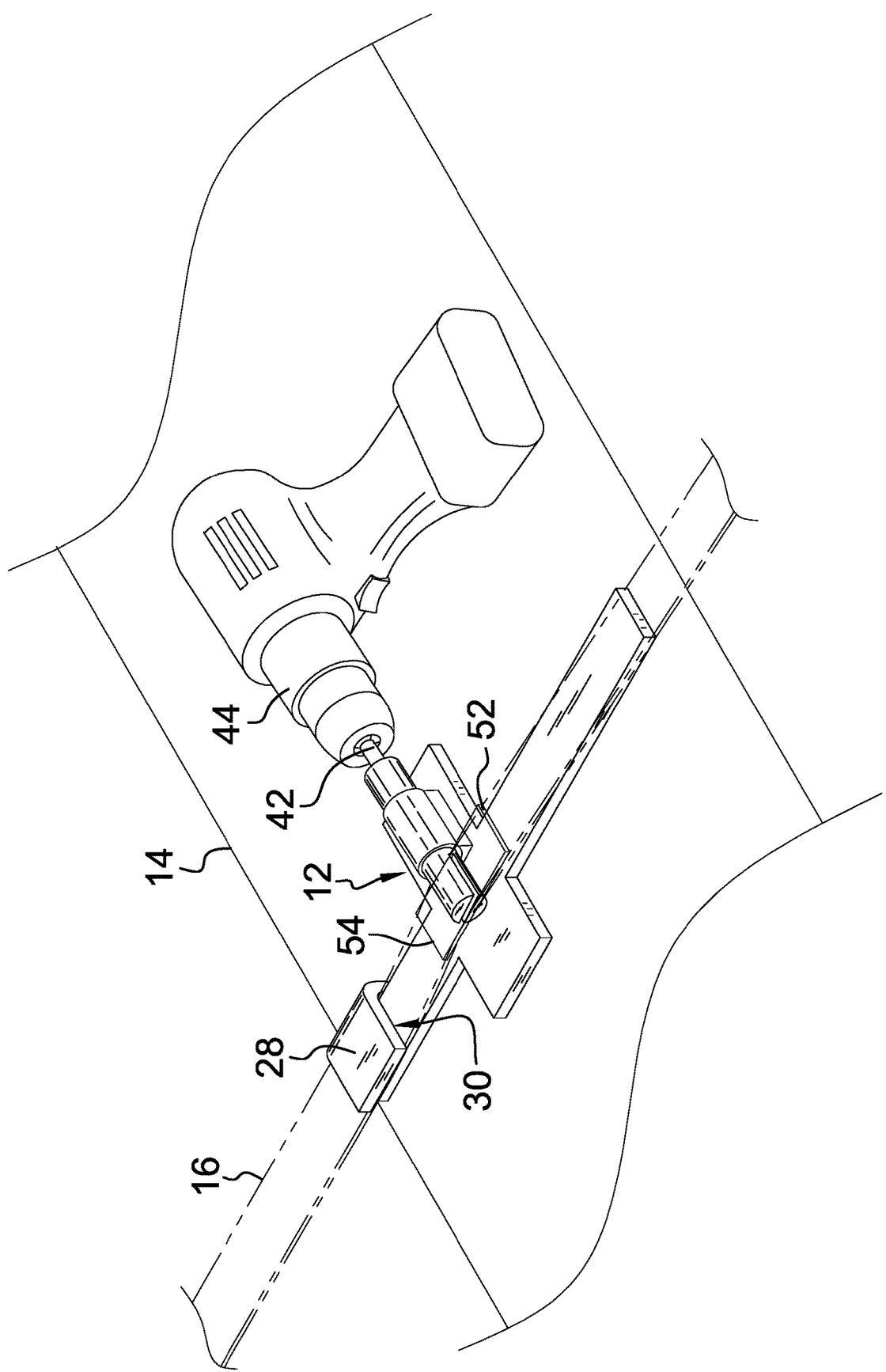
FIG. 5 is a perspective in-use view of an embodiment of the disclosure.

With reference now to the drawings, and in particular to FIGS. 1 through 5 thereof, a new tightening device embodying the principles and concepts of an embodiment of the disclosure and generally designated by the reference numeral 10 will be described.

As best illustrated in FIGS. 1 through 5, the band tightening assembly 10 generally comprises a guide 12 that is positionable against HVAC ducting 14. The guide 12 slidably engages a band 16 that extends around the HVAC ducting 14. The HVAC ducting 14 may be flexible heating and air conditioning ducting or the like and the band 16 may be a support band for suspending the HVAC ducting 14 to a joist or the like. The guide 12 has a first surface 18 and a first arm 20 intersecting a second arm 22. The first arm 20 extends along a longitudinal axis that is oriented perpendicular to the second arm 22 such that the first 20 and second 22 arms form a plus shape. The first arm 20 has a length ranging between approximately 3.0 inches and 4.0 inches, and the second arm 22 has a length ranging between approximately 9.0 inches and 10.0 inches. Additionally, the first arm 20 is positioned closer to a first end 24 of the second arm 22 than a second end 26 of the second arm 22.

A finger 28 is coupled to the guide 12 and the finger 28 is spaced from the first surface 18. Additionally, the finger 28 is oriented to lie on a plane that is oriented parallel to the first surface 18 of the guide 12 thereby defining a band space 30 between the finger 28 and the guide 12. The finger 28 is aligned with the first end 24 of the second arm 22. The band space 30 insertably receives the band 16 having the band 16 being oriented collinear with the second arm 22.

A collar 32 is coupled to the guide 12 and the collar 32 is positioned on the first arm 20. Additionally, the collar 32 is oriented to extend along an axis that is offset 4.0 degrees from the longitudinal axis of the first arm 20. The collar 32 is positioned on the first surface 18 of the first arm 20 and a shaft 34 is rotatably positioned in the collar 32. The shaft 34 has a rotational axis that is aligned with the axis of the collar 32. The shaft 34 has a slot 36 therein for insertably receiving the band 16.

The shaft 34 has an engaging well 38 therein and the engaging well 38 has a rectangular bounding surface 40 thereby facilitating the engaging well 38 to receive a socket drive 42 that is rotatably coupled to a power tool 44. The socket drive 42 may be a ⅜ socket drive or the like and the power tool 44 may be an electric drill or other rotating power tool. The shaft 34 is rotated about the rotational axis when the power tool 44 is turned on. In this way the power tool 44 can tighten the band 16 around the HVAC ducting 14.

The shaft 34 has a first end 46, a second end 48 and an outer surface 50 extending therebetween. The first end 46 of the shaft 34 has the slot 36 therein extending toward the second end 48 of the shaft and the slot 36 extends through the outer surface 50 of the shaft 34. The second end 48 of the shaft 34 has the engaging well 38 therein extending toward the first end 46 of the shaft 34. Moreover, the first end 46 of the shaft 34 is aligned with an intersection between the first 20 and second 22 arms of the guide 12. The shaft 34 is positionable in a loading position having the slot 36 in the outer surface 50 of the shaft 34 being aligned with the band space 30 between the finger 28 and the guide 12. Thus, the band 16 can be extended through the slot 36. In this way the band 16 is wrapped around the shaft 34 when the shaft 34 is rotated by the power tool 44 thereby facilitating the band 16 to be tightened around the HVAC ducting 14.

In use, the band 16 is positioned around the HVAC ducting 14 and the guide 12 is positioned against the HVAC ducting 14. The shaft 34 is rotated into the loading position, a first end 52 of the band 16 is extended through the band space 30 and the first end 52 of the band 16 is positioned in the slot 36 in the shaft 34. A second end 54 of the band 16 is positioned in the slot 36 from the opposite direction as the first end 52 of the band 16. The socket drive 42 is positioned in the engaging well 38 in the shaft 34 and the power tool 44 is turned on to rotate the shaft 34. Thus, the band 16 is wrapped around the shaft 34 thereby tightening the band 16 around the HVAC ducting 14. The band 16 is removed from the slot 36 and from the band space 30 when the band 16 is sufficiently tightened and the guide 12 is repositioned for subsequently tightening another band 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A band tightening assembly having a power tool being rotatably coupled thereto wherein said assembly is configured to tighten banding around HVAC ducting, said assembly comprising:

a guide being positionable against HVAC ducting, said guide slidably engaging a band extending around the HVAC ducting, said guide having a first arm intersecting a second arm, said first arm extending along a longitudinal axis being oriented perpendicular to said second arm such that said first and second arms forms a plus;

a collar being coupled to said guide, said collar being positioned on said first arm, said collar being oriented to extend along an axis being offset 4.0 degrees from said longitudinal axis of said first arm; and a shaft being rotatably positioned in said collar, said shaft having a rotational axis being aligned with said axis of said collar, said shaft having a slot therein for insertably receiving the band, said shaft having an engaging well therein, said engaging well having a rectangular bounding surface thereby facilitating said engaging well to receive a socket drive being rotatably coupled to a power tool, said shaft being rotated about said rotational axis when the power tool is turned on wherein the power tool is configured to tighten the band around the HVAC ducting.

2. The assembly according to claim 1, further comprising:

said guide having a first surface, said first arm having a length ranging between approximately 3.0 inches and 4.0 inches, said second arm having a length ranging between approximately 9.0 inches and 10.0 inches, said first arm being positioned closer to a first end of said second arm than a second end of said second arm; and a finger being coupled to said guide, said finger being spaced from said first surface of said guide and lying on a plane being oriented parallel to said first surface to define a band space between said finger and said guide, said finger being aligned with said first end of said second arm, said band space insertably receiving the band having the band being oriented collinear with said second arm.

3. A band tightening assembly having a power tool being rotatably coupled thereto wherein said assembly is configured to tighten banding around HVAC ducting, said assembly comprising:

a guide being positionable against HVAC ducting, said guide slidably engaging a band extending around the HVAC ducting, said guide having a first arm intersecting a second arm, said first arm extending along a longitudinal axis being oriented perpendicular to said second arm such that said first and second arms forms a plus, said guide having a first surface, said first arm having a length ranging between approximately 3.0 inches and 4.0 inches, said second arm having a length ranging between approximately 9.0 inches and 10.0 inches, said first arm being positioned closer to a first end of said second arm than a second end of said second arm;

a finger being coupled to said guide, said finger being spaced from said first surface of said guide and lying on a plane being oriented parallel to said first surface of said guide to define a band space between said finger and said guide, said finger being aligned with said first end of said second arm, said band space insertably receiving the band having the band being oriented collinear with said second arm;

a collar being coupled to said guide, said collar being positioned on said first arm, said collar being oriented to extend along an axis being offset 4.0 degrees from said longitudinal axis of said first arm, said collar being positioned on said first surface of said first arm; and a shaft being rotatably positioned in said collar, said shaft having a rotational axis being aligned with said axis of said collar, said shaft having a slot therein for insertably receiving the band, said shaft having an engaging well therein, said engaging well having a rectangular bounding surface thereby facilitating said engaging well to receive a socket drive being rotatably coupled to a power tool, said shaft being rotated about said rotational axis when the power tool is turned on wherein the power tool is configured to tighten the band around the HVAC ducting.

4. The assembly according to claim 3, wherein said shaft has a first end, a second end and an outer surface extending therebetween, said first end having said slot therein extending toward said second end, said slot extending through said outer surface of said shaft, said second end having said engaging well therein extending toward said first end, said first end being aligned with an intersection between said first and second arms of said guide.

5. The assembly according to claim 4, wherein said shaft is positionable in a loading position having said slot in said outer surface of said shaft being aligned with said band space between said finger and said guide thereby facilitating the band to be extended through said slot, said shaft wrapping the band therearound when said shaft is rotated by the power tool.

6. A band tightening assembly having a power tool being rotatably coupled thereto wherein said assembly is configured to tighten banding around HVAC ducting, said assembly comprising:

a guide being positionable against HVAC ducting, said guide slidably engaging a band extending around the HVAC ducting, said guide having a first arm intersecting a second arm, said first arm extending along a longitudinal axis being oriented perpendicular to said second arm such that said first and second arms forms a plus, said guide having a first surface, said first arm having a length ranging between approximately 3.0 inches and 4.0 inches, said second arm having a length ranging between approximately 9.0 inches and 10.0 inches, said first arm being positioned closer to a first end of said second arm than a second end of said second arm;

a finger being coupled to said guide, said finger being spaced from said first surface of said guide and lying on a plane being oriented parallel to said first surface of said guide to define a band space between said finger and said guide, said finger being aligned with said first end of said second arm, said band space insertably receiving the band having the band being oriented collinear with said second arm;

a collar being coupled to said guide, said collar being positioned on said first arm, said collar being oriented to extend along an axis being offset 4.0 degrees from said longitudinal axis of said first arm, said collar being positioned on said first surface of said first arm; and a shaft being rotatably positioned in said collar, said shaft having a rotational axis being aligned with said axis of said collar, said shaft having a slot therein for insertably receiving the band, said shaft having an engaging well therein, said engaging well having a rectangular bounding surface thereby facilitating said engaging well to receive a socket drive being rotatably coupled to a power tool, said shaft being rotated about said rotational axis when the power tool is turned on wherein the power tool is configured to tighten the band around the HVAC ducting, said shaft having a first end, a second end and an outer surface extending therebetween, said first end having said slot therein extending toward said second end, said slot extending through said outer surface of said shaft, said second end having said engaging well therein extending toward said first end, said first end being aligned with an intersection between said first and second arms of said guide, said shaft being positionable in a loading position having said slot in said outer surface of said shaft being aligned with said band space between said finger and said guide thereby facilitating the band to be extended through said slot, said shaft wrapping the band therearound when said shaft is rotated by the power tool.

\* \* \* \* \*